US012149662B2

(12) United States Patent
Aoyama et al.

(10) Patent No.: US 12,149,662 B2
(45) Date of Patent: Nov. 19, 2024

(54) SCANNING DEVICE COMPRISING A SENSOR ASSEMBLY INCLUDING PHOTOELECTRIC CONVERSION ELEMENTS IN A ROW THAT DETECT A RECTANGULAR HOLE TO DETERMINE A SCANNING START POSITION

(71) Applicant: BROTHER KOGYO KABUSHIKI KAISHA, Nagoya (JP)

(72) Inventors: Kentaro Aoyama, Nagoya (JP); Kunihiro Amano, Kitanagoya (JP); Seiya Sato, Yokkaichi (JP); Kazushi Shumiya, Konan (JP); Jie Zheng, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/936,896

(22) Filed: Sep. 30, 2022

(65) Prior Publication Data
US 2023/0027157 A1    Jan. 26, 2023

Related U.S. Application Data

(63) Continuation of application No. PCT/JP2021/012213, filed on Mar. 24, 2021.

(30) Foreign Application Priority Data

Mar. 31, 2020    (JP) .................................. 2020-064832

(51) Int. Cl.
*H04N 1/028*    (2006.01)
*H04N 1/00*    (2006.01)
*H04N 1/031*    (2006.01)

(52) U.S. Cl.
CPC ....... *H04N 1/00748* (2013.01); *H04N 1/0079* (2013.01); *H04N 1/0281* (2013.01); *H04N 1/0313* (2013.01)

(58) Field of Classification Search
CPC ............. H04N 1/00748; H04N 1/0079; H04N 1/0281; H04N 1/0313; H04N 1/10; G03B 27/50; G03B 27/62; G06T 3/4007
(Continued)

(56) References Cited

U.S. PATENT DOCUMENTS

| 2008/0225357 | A1  | 9/2008  | Ohara et al. |
| 2009/0009824 | A1* | 1/2009  | Nakayama ......... H04N 1/00053 358/474 |
| 2010/0277776 | A1* | 11/2010 | Osakabe ................ H04N 1/047 358/474 |

(Continued)

FOREIGN PATENT DOCUMENTS

| JP | H0494858 U    | 8/1992  |
| JP | 2002354206 A  | 12/2002 |

(Continued)

OTHER PUBLICATIONS

International Search Report dated Jun. 15, 2021 issued in PCT/JP2021/012213.
(Continued)

*Primary Examiner* — Chad Dickerson
(74) *Attorney, Agent, or Firm* — Scully, Scott, Murphy & Presser, P.C.

(57) ABSTRACT

A scanning device includes a casing holding a original document table. A facing area is provided to the casing, and a rectangular hole is formed on the facing area. The rectangular hole has edges extending along a main scanning direction and edges extending along a sub-scanning direction. The edges extending along the sub-scanning direction are located in a central area of a photoelectric conversion element row of a sensor assembly in the main scanning (Continued)

direction. The sensor assembly scans the rectangular hole and detects a edge extending along the main scanning direction and a edge extending along the sub-scanning direction, thereby determines a scanning start position.

11 Claims, 6 Drawing Sheets

(58) Field of Classification Search
USPC .............. 358/488, 498, 474, 1.11–1.18
See application file for complete search history.

(56) References Cited

U.S. PATENT DOCUMENTS

| | | | |
|---|---|---|---|
| 2011/0075229 A1* | 3/2011 | Fujiwara | H04N 1/00002 358/488 |
| 2018/0270385 A1* | 9/2018 | Zheng | H04N 1/00997 |

FOREIGN PATENT DOCUMENTS

| | | | |
|---|---|---|---|
| JP | 2002354207 A | | 12/2002 |
| JP | 2008172467 A | * | 7/2008 |
| JP | 2008227971 A | | 9/2008 |
| JP | 2009017021 A | | 1/2009 |
| JP | 2009017022 A | | 1/2009 |
| JP | 2010263318 A | | 11/2010 |
| JP | 2012074834 A | * | 4/2012 |

OTHER PUBLICATIONS

International Preliminary Report on Patentability and Written Opinion dated Sep. 29, 2022 issued in PCT/JP2021/012213 together with English language translation.

Notice of Reasons for Refusal dated May 14, 2024 received from the Japanese Patent Office in related application JP 2020-064832.

* cited by examiner

SCANNING DEVICE COMPRISING A SENSOR ASSEMBLY INCLUDING PHOTOELECTRIC CONVERSION ELEMENTS IN A ROW THAT DETECT A RECTANGULAR HOLE TO DETERMINE A SCANNING START POSITION

REFERENCE TO RELATED APPLICATIONS

This application is a continuation application based on International Patent Application PCT/JP2021/012213 filed on Mar. 24, 2021, which was filed claiming priority from Japanese Patent Application No. 2020-064832 filed on Mar. 31, 2020. The entire contents of the International Patent Application and priority application are incorporated herein by reference.

BACKGROUND ART

The present disclosures relate to a scanning device.

In a flat bed (FB) type scanning device configured to scan a document, a scanning unit configured to scan one line of image along a main scanning direction is provided under an original document table on which an original document is to be placed. The scanning unit is configured to move in a sub-scanning direction which is orthogonal to the main scanning direction. In this type of scanning device, an origin position is detected to determine a scanning range to be scanned by the scanning unit, and after the origin is detected, the scanning unit is moved to a position corresponding to the scanning start position at the beginning of the scanning range to start scanning the original document.

Regarding detection of the origin, various ways of detecting the origin point have been suggested. Such various ways include a method of providing a photo sensor, and detecting the origin position based on a position of the scanning unit when the scanning unit is detected by the photo sensor, or a method of scanning a mark provided on a holder that surrounds and holds a document table with a scanning unit, and detecting the origin position from the position of the mark scanned by the scanning unit. However, in these methods, if a position of the photo sensor or a position of the mark varies among products, the origin position which is determined based on the photo sensor and the mark, also varies.

In view of such problems, another method has been proposed in which a rectangular hole is formed in the holder, the rectangular hole is read by the scanning unit, and the scanning start position is calibrated based on the position of the edge of the rectangular hole. Since the retainer is made of resin and the rectangular holes are made during the molding of the retainer, there is practically no variation in position among products. Therefore, it is possible to accurately calibrate the scanning start position based on the position of the rectangular hole edges.

In recent years, contact image sensors (CIS) with equal magnification optics have been used in scanning devices. In a CIS with equal magnification optics, a required size of a photoelectric converter is larger than a size of a combination of a reduction optics system and a CCD module. Therefore, taking yield rate into consideration, the photoelectric converter is configured such that multiple chips with many photoelectric conversion elements are arrayed in the main scanning direction.

Therefore, there is a seam of photoelectric conversion element row in one line, and there are areas where no photoelectric conversion elements are present. However, the seam is about the size of one or two pixels, and although depending on the resolution, the quality of the scanning results by the scanning device is such that the incongruity caused by the seam can be eliminated by interpolation from the surrounding data.

However, when the scanning position is calibrated by the position of the rectangular hole in the holder as described above, in the side of the rectangular hole that extends in the sub-scanning direction, it is hard to form a shadow of the side by light from the light source of the scanning device, and its pixel width is about 1 to 2 pixels. Therefore, if the side extending to the sub-scanning direction and a chip of the photoelectric converter, pixels in the side are lost from the scanning results, and the scanning start position in the main scanning direction is not able to be determined.

According to aspects of the present disclosure, there is provided a scanning device including an original document table including an original document placement surface on which an original document is to be placed, a sensor assembly configured to move in a sub-scanning direction to scan the original document placed on the original document table, the sensor assembly facing the original document table from an opposite side of the original document placement surface, the sensor assembly including a light source and a photoelectric converter, the photoelectric converter including a photoelectric conversion element row, the photoelectric conversion element row including a plurality of photoelectric conversion elements arranged in a main scanning direction, and a holder configured to hold a peripheral part of the original document table, the holder including a facing area facing the peripheral part from a side of the original document placement surface. A rectangular hole is formed on the facing area, the rectangular hole having edges extending along the main scanning direction and edges extending along the sub-scanning direction. At least one of the edges extending along the sub-scanning direction located at a position corresponding to a central area of the photoelectric conversion element row with excluding each end thereof.

DESCRIPTION

According to aspects of the present disclosure, there is provided a scanning device including an original document table including an original document placement surface on which an original document is to be placed, a sensor assembly configured to move in a sub-scanning direction to scan the original document placed on the original document table, the sensor assembly facing the original document table from an opposite side of the original document placement surface, the sensor assembly including a light source and a photoelectric converter, the photoelectric converter including a photoelectric conversion element row, the photoelectric conversion element row including a plurality of photoelectric conversion elements arranged in a main scanning direction, and a holder configured to hold a peripheral part of the original document table, the holder including a facing area facing the peripheral part from a side of the original document placement surface. A rectangular hole is formed on the facing area, the rectangular hole having edges extending along the main scanning direction and edges extending along the sub-scanning direction. At least one of the edges extending along the sub-scanning direction located at a position corresponding to a central area of the photoelectric conversion element row with excluding each end thereof.

Hereinafter, referring to the accompanying drawings, an embodiment according to the present disclosures will be described in detail.

Configuration of Scanning Device

Figure 1:
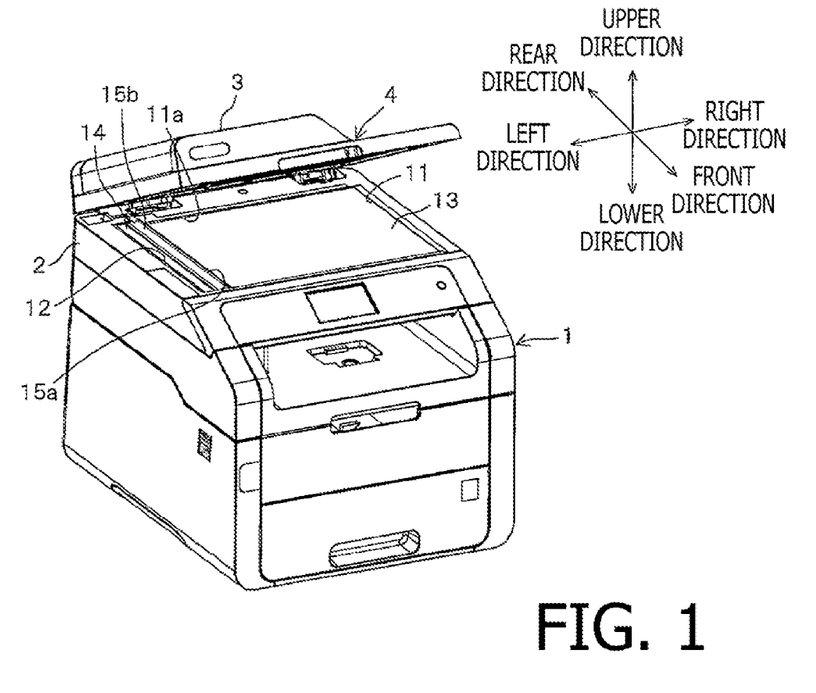
FIG. 1 is a perspective view of a scanning device according to a present embodiment.
Figure 2:
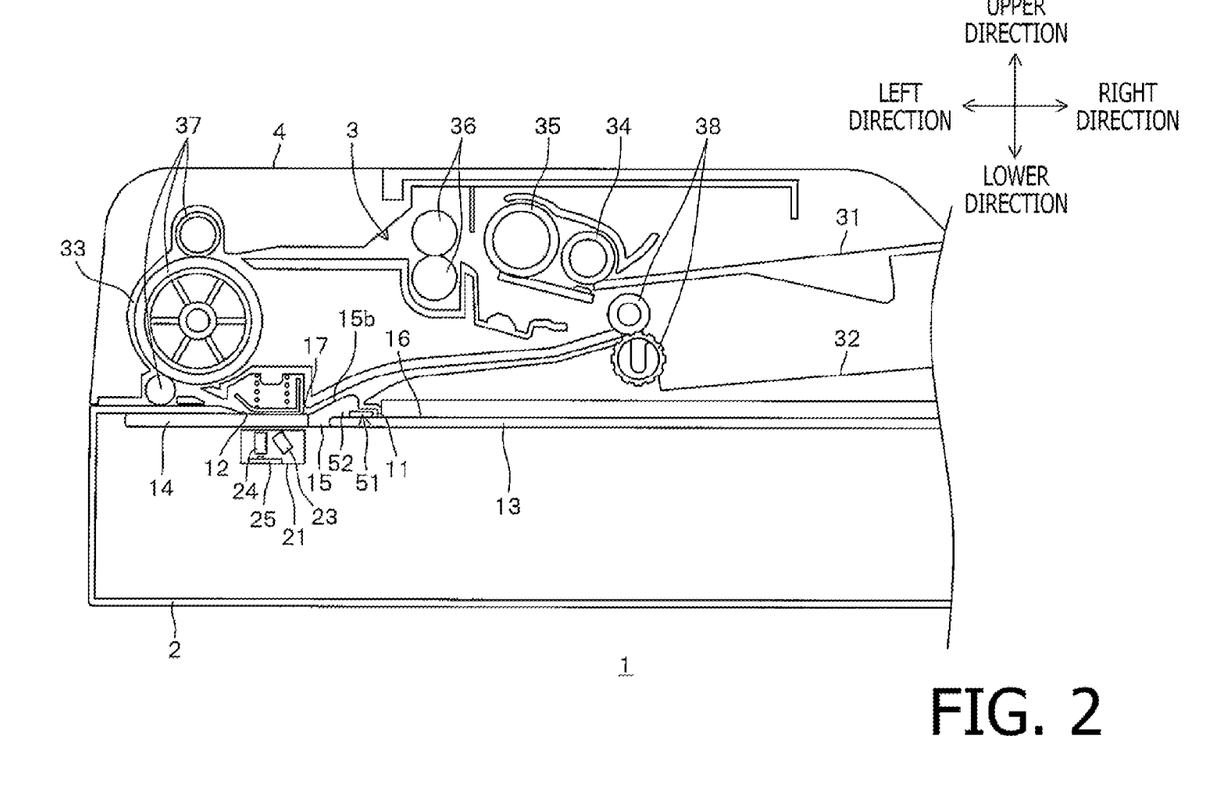
FIG. 2 schematically shows a cross-sectional view of the scanning device taken along a plane perpendicular to a front-rear direction indicated in FIG. 1.

A scanning device 1 shown in FIGS. 1 and 2 is a device configured to scan an original document. The scanning device 1 has a casing 2, which is an example of a holder, and an original document cover 4 to which an ADF (auto document feeder) 3 is integrally provided. For example, the scanning device 1 is a multifunction peripheral (MFP) having a scanning function.

For the sake of following description, directions with respect to the scanning device 1 will be defined as follows. A right side and a left side of the scanning device are respectively defined as a right direction and a left direction when the scanning device 1 is viewed from a front side. An upper side and a lower side of the scanning device 1 are respectively defined as an upper direction and a lower direction when the scanning device 1 is installed on a horizontal surface. FIG. 2 is a cross-sectional side view of the scanning device 1, which is taken along a plane extending in the right-left direction and in the upper-lower direction.

The casing 2 is a resin molded product and has a rectangular parallelepiped shape. On an upper surface of the casing 2, a first opening 11 and a second opening 12 are formed. The first opening 11 has a rectangular shape which has sides extending in the front-rear direction and sides extending in the right-left direction. The rectangular shape of the first opening 11 extends longer in the right-left direction than in the front-rear direction and. The second opening 12 has a rectangular shape which has edges extending in the front-rear direction and edges extending in the right-left direction. The rectangular shape of the second opening 12 is elongated in the front-rear direction and.

An original document table 13 (an example of an original document table) is provided to cover the first opening 11 from below. The original document table 13 is a planar plate member made of transparent material which is, for example, a planar glass plate. The original document table 13 is surrounded by the peripheral portion of the first opening 11 of the casing 2 and held thereby.

Further, an original document passage plate 14 is provided to cover the second opening 12 from below. The original document passage plate 14 is a planar plate-like member made of transparent material, which is, for example, a glass plate. The original document passage plate 14 is surrounded by the peripheral portion of the second opening of the casing 2 and held by a front part, a rear part and a left-side part thereof.

A part between the first opening 11 and the second opening 12 of the casing 2 is a guide 15 which serves as a guide of the original document when scanned. The guide 15 has a tip-end reference surface 15a on the right end surface, which is a planar surface extending in the front-rear and upper-lower directions, and a conveyance guide surface 15b on its upper surface, which slopes up to the right.

The scanning device 1 is configured to scan the original document in accordance with either a FB method or an ADF method. The upper surface of the original document table 13 is an original document placement surface 16 on which the original document is placed when the document is scanned according to the FB method. The guide 15 serves as a guide to position the original document on the original document placement surface 16. The document is placed in such a manner that the left edge contacts the tip-end reference surface 15a of the guide 15 from the right side, and the rear edge contacts a rear reference surface 11a facing the front side of the first opening 11. The upper surface of the original document passage plate 14 is an original document passage surface 17 through which the original document passes when scanned according to the ADF method. The guide 15 serves as a guide to convey the original document, and the original document is conveyed along the conveyance guide surface 15b of the guide 15 after it passes through the original document passage surface 17.

Figure 3:
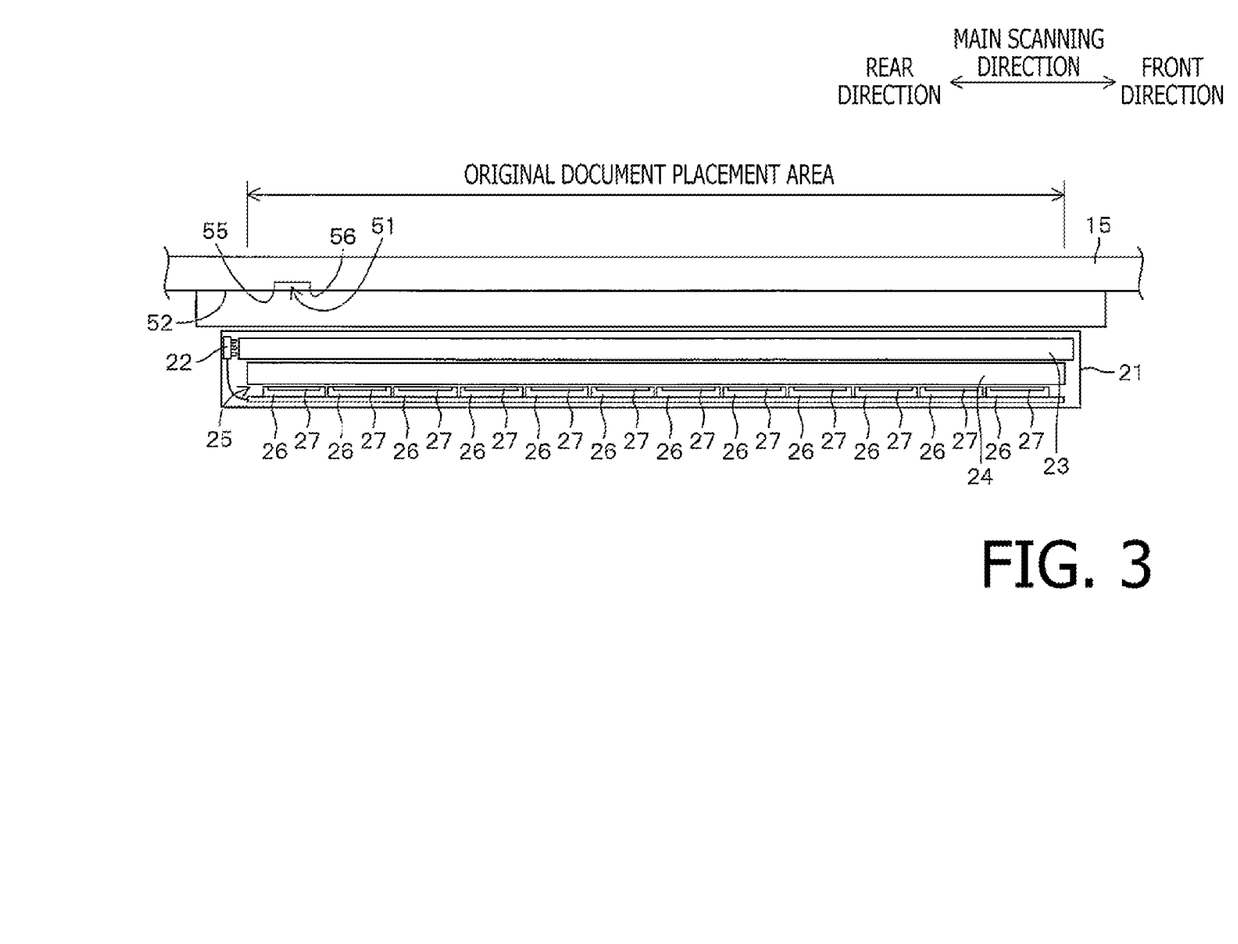
FIG. 3 schematically shows the CIS assembly when viewed in the right-left direction indicated in FIG. 1.

In the casing 2, a CIS (contact image sensor) assembly 21 is provided in such a manner that the CIS assembly 21 is movable, by the CIS assembly driver 28, below the original document table 13 and the original document passage plate 14, in the sub-scanning direction, which is the right-left direction. The CIS assembly 21 (which is an example of a assembly) is provided with a light source 22, a light guide 23, a rod lens array 24, and a photoelectric converter 25 as shown in FIG. 3.

The light source 22 includes LEDs (light emitting diodes) of red, green and blue.

The light guide 23 is a member that propagates light from the light source 22, and is made of transparent material. For example, the light guide 23 extends in the main scanning direction, which is the front-rear direction orthogonal to the sub-scanning direction, in front of the light source 22.

The rod lens array 24 includes refractive index distribution type lenses and has many rod lenses aligned in the main scanning direction. The rod lens array 24 is positioned to be shifted in the left or right direction with respect to the light guide 23. For example, the rod lens array 24 is arranged on the left side of the light guide 23.

The photoelectric converter 25 has a particular number (e.g., 12) of sensor IC chips 26. The sensor IC chips 26 are arranged in a row in the main scanning direction. The photoelectric conversion element row 27 includes a plurality of photoelectric conversion elements arranged in a row at an equal pitch in the main scanning direction. Each photoelectric conversion element outputs a charge corresponding to the amount of light received as an electrical signal for one pixel. The CIS assembly 21 includes a gain adjustment circuit and an A/D conversion circuit. The voltage output from each photoelectric conversion element is converted to pixel data (pixel value), which is a digital value, by the A/D conversion circuit after amplification by the gain adjustment circuit. The A/D conversion circuit has a resolution, for example, of 8 bits (0 to 255). The A/D conversion circuit is configured to convert the voltage below the lower reference voltage (i.e., lower limit) to "0," convert the voltage above the upper reference voltage (i.e., upper limit) to "255," and convert the voltage between the lower and upper limits to pixel data according to the am of the voltage.

Light from the light source 22 is irradiated onto the scanning target object through the light guide 23, and the reflected light from the scanning target object passes through the rod lens array 24 and enters the photoelectric converter 25. Photoelectric conversion is performed at each photoelectric conversion element in the photoelectric converter 25, and an electrical signal is output from each photoelectric conversion element, which is converted into pixel data to achieve scanning of one line in the main scanning direction by the CIS assembly 21.

As shown in FIG. 2, the ADF 3 (which is an example of a document feeder) includes a supply tray 31 and a discharge tray 32. The supply tray 31 and the discharge tray 32 are arranged in an overlapped state with a space therebetween in the upper-lower directions. In the ADF 3, a conveyance path 33 is defined. The conveyance path 33 is configured in such a manner that one end of the conveyance path 33 is opened on the supply tray 31 at one side in the sub-scanning direction, and folded back as being curved in a U-shape. The conveyance path 33 further passes on the original document passage surface 17 so that the other end of the conveyance path 33 is opened at a portion between the supply tray 31 and the discharge tray 32. In the ADF 3, the supply roller 34, a separation roller 35, a conveyance roller 36, an inverting roller 37, and the ejection roller 38 are provided along the conveyance path 33, in this order from the supply tray 31 side.

The original document cover 4 is provided so as to be opened and closed to be located at open and closed positions, respectively. In a state where the original document cover 4 is located at the closed position, the entire upper surface of the casing 2 is covered by the original document cover 4. When a closer side of the original document cover 4 located at the closed position is lifted, the original document cover 4 is displaced to the opened position. In a state where the original document cover 4 is located at the opened position, the entire upper surface of the casing 2 is exposed to the outside.

When scanning an original document using the FB method, the original document cover 4 is opened to the opened position and the document is placed on the original document placement surface 16. The original document cover 4 is then closed to the closed position, and the original document is covered from the top by the original document cover 4. Then, in response to a command to execute scanning, the CIS assembly 21 is moved by the CIS assembly driver 28 from the origin position to a position corresponding to the scanning start position at the beginning of the scanning range, and from that position, the CIS assembly 21 is moved in the sub-scanning direction while scanning the original document on the original document placement surface 16 one line at a time in the sub-scanning direction, thereby achieving document scanning.

On the other hand, when scanning the original document using the ADF method, the original document is placed on the supply tray 31 of the ADF 3. The CIS assembly 21 is stopped at a position where the CIS assembly 21 faces the original document passage plate 14 from below. The original document is then conveyed by the supply roller 34 in response to the command to perform scanning. The original documents are separated one-by-one at a time by the separation roller 35 and conveyed through the conveyance path 33 by the conveyance roller 36 and the inverting roller 37.

The scanning of the document is achieved as the CIS assembly 21 scans the original document one line at a time, in sequence, while the original document passing through the original document passage surface 17.

Figure 4:
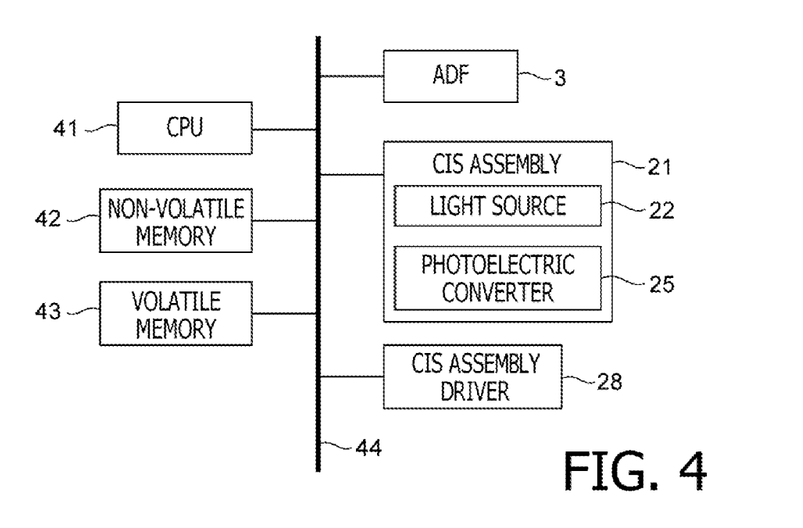
FIG. 4 is a block diagram illustrating an electrical configuration of the scanning device.

As shown in FIG. 4, the scanning device 1 has a CPU 41, a non-volatile memory 42 (e.g., a flash memory or an EEPROM) that is a memory in which data can be rewritten, and a volatile memory 43 such as an SDRAM. The CPU 41, the non-volatile memory 42, and the volatile memory 43 are connected to a bus 44 for data communication.

The CPU 41 (an example of a controller) controls each component of the scanning device 1, including the ADF 3, the CIS assembly 21, and the CIS assembly driver 28, by executing programs for various processes. The CIS assembly driver 28 is composed of a moving guide, motor, drive mechanism, and the like, which are not shown in the drawings. The non-volatile memory 42 stores programs to be executed by the CPU 41 and various data. The volatile memory 43 is used as a work area when the CPU 41 executes the program.

Determination of Scanning Range

At the beginning of scanning the original document using the FB method, the CIS assembly 21 is moved to a position corresponding to the scanning start position, as described above. The scanning start position is a top position of the scanning range, to be scanned by the CIS assembly 21, of the original document. In order to scan the entire original document that is poked against the tip-end reference surface 15*a* or the rear reference surface 11*a* by the CIS assembly 21, it is necessary to precisely coincide the scanning start position with the position of the rear reference surface 11*a* in the main scanning direction and with the position of the tip-end reference surface 15*a* in the sub-scanning direction.

Figure 5:
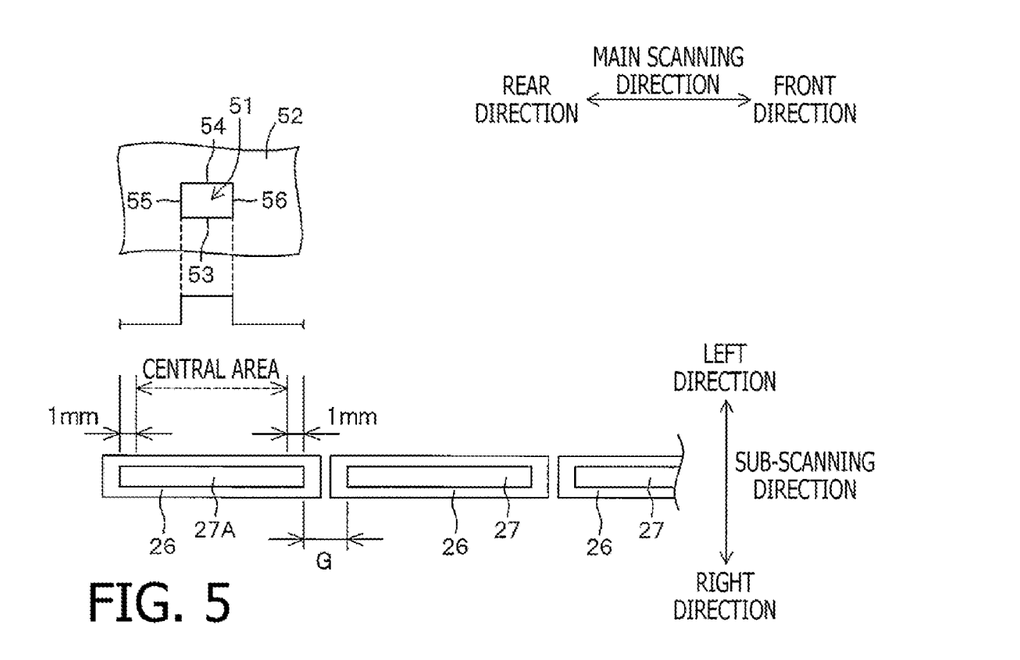
FIG. 5 shows a positional relationship between a rectangular hole and a photoelectric conversion element row.

To determine the scanning start position, a rectangular hole 51 is formed on the guide 15, as shown in FIG. 3. Concretely, the guide 15 has a facing area 52 that faces the left side of the original document table 13 from above, as shown in FIG. 2. In this facing area 52, as shown in FIG. 5, an upwardly recessed rectangular hole 51 with 5 mm on each edge and a depth of 0.5 mm is formed at a position, in the main scanning direction, corresponding to the area on the original document placement surface 16 where the original document is placed, and a position corresponding to the photoelectric conversion element row 27 (hereinafter, the photoelectric conversion element row 27 is referred to as the photoelectric conversion element row 27A) closest to the light source 22 among the photoelectric conversion element rows 27 of the CIS assembly 21 (i.e., a position corresponding to the photoelectric conversion element row 27 arranged at the most rear side).

Depending on the design of the light guide 23, the central part of the scanning range in the main scanning direction can be made brighter. In such a case, the rectangular hole 51 should be placed at a position corresponding to the position of the photoelectric conversion element row 27 corresponding to the position designed to be the brightest.

The rectangular hole 51 has a first edge 53 and a second edge 54, extending along the main scanning direction, at the left end and right end, respectively, and has a third edge 55 and a fourth edge 56, extending along the sub-scanning direction, at the rear end and the front end, respectively. These edges 53-56 form sides of a rectangular shape of the rectangular hole 51, respectively. The distance between the third edge 55 and the fourth edge 56 in the sub-scanning direction is shorter than the length of the photoelectric conversion element row 27 in the main scanning direction. The third edge 55 and the fourth edge 56 are arranged at a position corresponding to a central area CA of the photoelectric conversion element row 27A. Therefore, the position corresponding to the photoelectric conversion element row 27A is, in other words, a position at which the third edge 55 and the fourth edge 56 of the rectangular hole 51 are arranged, in the up-down direction, to face each other with the central area CA of the photoelectric conversion element row 27A being located therebetween. The central region CA is, for example, an area of the photoelectric conversion element row 27A with excluding the area of 1 mm from each end thereof in the main scanning direction.

Figure 6:
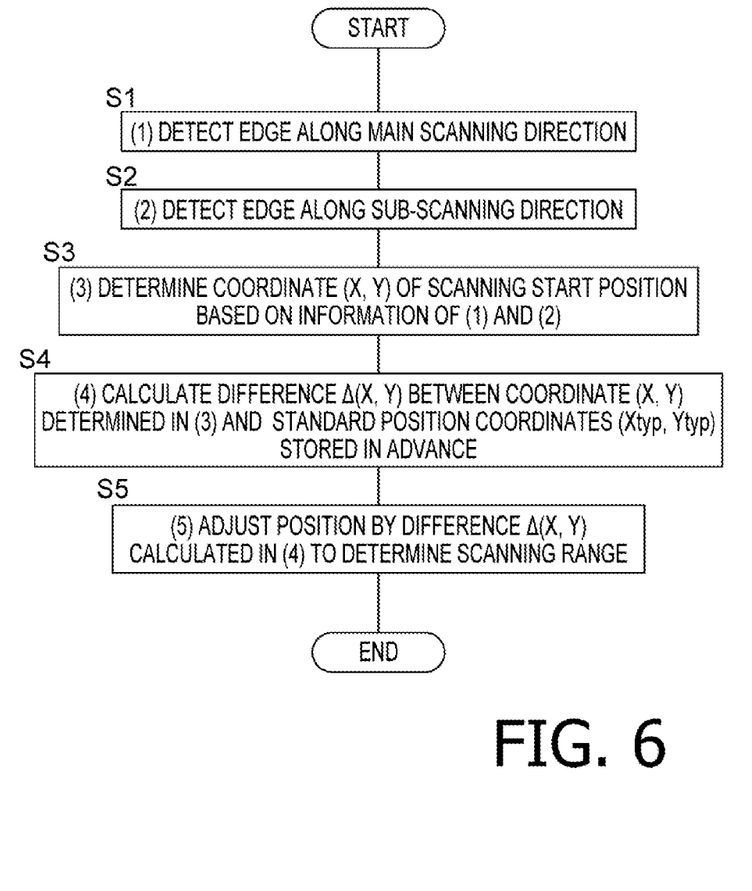
FIG. 6 is a flowchart illustrating a scanning area determining process.

The CPU 41 determines the scanning start position in accordance with a scanning area determining process shown in FIG. 6.

When determining the scanning start position, the CPU 41 moves the CIS assembly 21 to a position at least one side (e.g., to the left direction) with respect to the rectangular hole 51 in the sub-scanning direction. Thereafter, the CPU 41 moves the CIS assembly 21 to the other side in the sub-scanning direction (e.g., to the right direction) while having the CIS assembly 21 scan the area where the facing area 52 formed with the rectangular hole 51 exists.

Then, the CPU 41 detects the first edge 53 along the main scanning direction of the rectangular hole 51 from the data generated by the CIS assembly 2 (S1). Since the area where the facing area 52 exists does not include shapes of figures, which could be a reason for the density change, other than the rectangular hole 51, an edge enhancement process using a Sobel filter or the like is used for the edge detection. The CPU 41 then determines that the first edge 53 to fourth 56 edge are located at positions where the edges are determined to exist by the edge enhancement process.

Figure 7A:
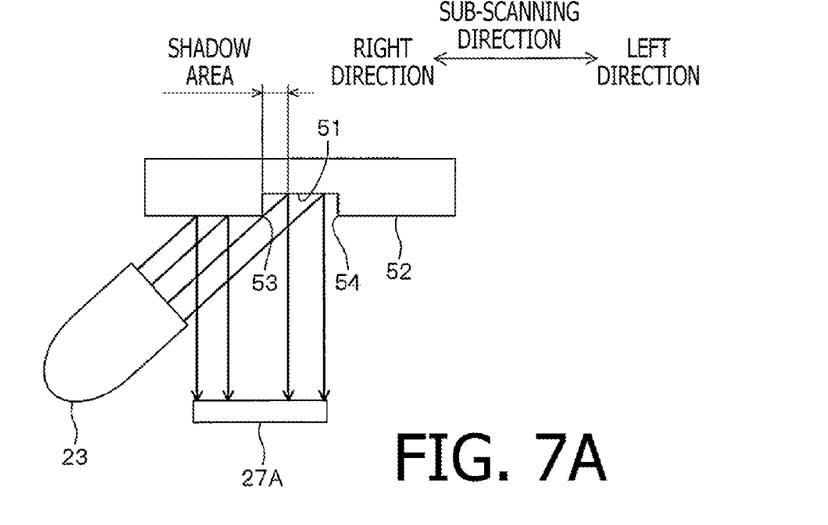
FIG. 7A schematically shows a case where how light irradiates when a first edge of the rectangular hole is detected.
Figure 7B:
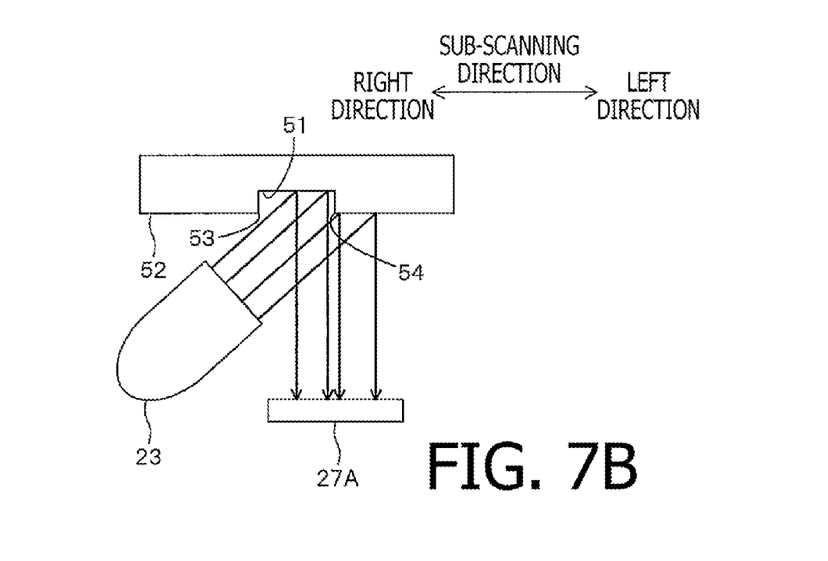
FIG. 7B schematically shows a case where how light irradiates when a second edge of the rectangular hole is detected.

The reason for detecting the first edge 53 instead of the second edge 54 is that, when viewed along a direction of the light from the light guide 23, since the first edge 53 is a edge connected from the facing area 52 to the rectangular hole 51 as shown in FIG. 7A, a left-hand edge of the first edge 53 in FIG. 7A becomes a shadow area to which the light from the light guide 23 does not reach, and the difference in density between the reflected light from the facing area 52 and the shadow area of the rectangular hole 51 becomes large. The larger the density difference, the more reliable the detection of the edge enhancement process. As shown in FIG. 7B, the light from the light guide 23 reflected at the bottom of the rectangular hole 51 and the light reflected at the facing area 52 are adjacent to each other, so the difference in density at the second edge 54 is smaller than a difference in density at the first edge 53. Therefore, the first edge 53 is detected instead of the second edge 54.

Based on the data output by the CIS assembly 21 as a result of scanning, the CPU 41 detects the third edge 55 of the rectangular hole 51 extending along the sub-scanning direction (S2). Since the third edge 55 and the fourth edge 56 exist in the direction parallel to the light direction from the light guide 23, there is not much difference in a size of the shadow area. However, since the third edge 55 is closer to the light source 22 in the main scanning direction and is illuminated brighter by the light from the light source 22 than the fourth edge 56, the difference in density is larger than that of the fourth edge 56, and the third edge 55 can be detected with higher accuracy.

The CPU 41 then determines the X coordinate of third edge 55, with the main scanning direction as the X direction and the sub-scanning direction as the Y direction. Then, based on a distance between the X coordinate of the third edge 55 and the design-determined X coordinate of the rear reference surface 11a, the CPU 41 determines the coordinate of the scanning start position in the main scanning direction (S3). Further, the CPU 41 obtains the Y coordinate of the central position of the first edge 53. Then, based on a distance between the Y coordinate of the central position of the first edge 53 and the Y coordinate of the design-determined tip-end reference surface 15a, the CPU 41 determines the coordinate of the scanning start position in the sub-scanning direction (S3).

In the non-volatile memory 42, the standard coordinates of the scanning start position are stored in advance as the standard position coordinates (Xtyp, Ytyp). The CPU 41 calculates a difference Δ(X, Y) between the coordinates (X, Y) of the scanning start position obtained from the scanning results and the standard position coordinates (Xtyp, Ytyp) stored in the non-volatile memory 42 (S4).

Then, the CPU 41 adjusts the scanning range of the original document by the difference Δ(X, Y) when the standard position coordinates (Xtyp, Ytyp) as the scanning start position, and then determines the scanning range of the original document after the position adjustment as the scanning range of the document (S5).

Effects

As described above, the casing 2 that holds the original document table 13 has the facing area 52 that faces the original document placement surface 16 of the original document table 13. The facing area 52 has the rectangular hole 51 having the first edge 53 and second edge and 54 extending along the main scanning direction and the third edge 55 and fourth edge 56 extending along the sub-scanning direction. The casing 2 is a resin mold. Therefore, there are substantially no variations among the products in the placement position of the original document among products, i.e., the positional relationship of the tip-end reference surface 15a and the rear reference surface 11a, which define the area necessary to be scanned, with respect to the rectangular hole 51.

The photoelectric converter 25 of the CIS assembly 21 is composed of photoelectric conversion element rows 27 aligned in the main scanning direction. The third edge 55 and fourth edge 56 extending along the sub-scanning direction of the rectangular hole 51 are located corresponding to the central area CA, in the main scanning direction, of the photoelectric conversion element row 27. As a result, even if there is a seam G (see FIG. 5) in the photoelectric conversion element row 27, the third and fourth edges 55 and 56, which are located in the position corresponding to the central area CA of the photoelectric conversion element row 27, can be read without being affected by the seam G.

The rectangular hole 51 is then scanned by the CIS assembly 21, the first edge 53 and third edge 55 of the rectangular hole 51 are detected, and the coordinates of the scanning start position are determined based on the X coordinate of the third edge 55 and the Y coordinate of the center position of the first edge 53. Therefore, the scanning start position can be well determined based on the position of the edges of rectangular hole 51.

The rectangular hole 51 is formed on the lower surface that contacts the original document table 13 (original document placement surface 16) in the facing area 52. Therefore, focused scanning can be achieved by scanning the rectangular hole 51 under the condition the same as that when the original document is scanned. As a result, the third and fourth edges 55 and 56 of the rectangular hole 51 can be scanned well.

The rectangular hole 51 is formed at a position, in the main scanning direction, which corresponds to the area where the original document is to be placed, of the original document placement surface 16. The area where the original document is placed is the area to be scanned by the CIS assembly 21 under the scanning conditions such as shading correction, etc. has been adjusted. Therefore, by forming the rectangular hole 51 at the position corresponding to that area, the rectangular hole 51 can be scanned with high accuracy. As a result, the scanning start position can be determined more appropriately.

Furthermore, the rectangular hole 51 is formed on the guide 15 between the original document placement surface 16 and the original document passage surface 17. The home position of the CIS assembly 21, the origin position, is located between the original document placement surface 16 and the original document passage surface 17, which reduces the time required to move the CIS assembly 21 from the origin position for scanning the rectangular hole 51.

The third edge 55 and the fourth edge 56 of the rectangular hole 51 are arranged at positions corresponding to the central area CA of the photoelectric conversion element row 27A. This prevents the third edge 55 and the fourth edge 56 from overlapping the seam G of the photoelectric conversion element row 27 or spreading over two photoelectric conversion element rows.

Furthermore, since the central area CA is set in an area excluding the area 1 mm from each end of the photoelectric conversion element row 27A, the overlap between the third edge 55 and the fourth edge 56 and the seam G of the photoelectric conversion element row 27 can be reliably prevented even if the assembly and component tolerances of the CIS assembly 21 and others are accumulated.

Modification

Although one embodiment of according to the present disclosures has been described above, aspects of the present disclosures can also be implemented in a modified manner.

For example, even if both the third 55 and fourth 56 edges of the rectangular hole 51 are not located at a position corresponding to the central area CA of the photoelectric conversion element row 27A, at least the third 55 edge, which is to be detected when determining the reading start position, should be located at a position corresponding to the central area CA.

Various other design changes can be made to the aforementioned configuration within the scope of the claims.

What is claimed is:

1. A scanning device, comprising:
   a casing;
   an original document table having a peripheral part being held by the casing, the original document table including an original document placement surface on which an original document is to be placed;
   a sensor assembly movable in a sub-scanning direction to scan the original document placed on the original document table, the sensor assembly including a light source and a photoelectric converter which faces the original document table from an opposite side of the original document placement surface, the photoelectric converter including a plurality of sensor chips, each of the plurality of sensor chips including a photoelectric conversion element row in which a plurality of photoelectric conversion elements are arranged in a main scanning direction, a seam being provided between a position corresponding to a photoelectric conversion element row of a first sensor chip and a position corresponding to another photoelectric conversion element row of a second sensor chip, the first sensor chip being closest to the light source, and the second sensor chip being adjacent to the first sensor chip in the main scanning direction
   where the casing has a facing area facing the peripheral part of the original document table from a side of the original document placement surface,
   wherein a rectangular hole is formed on the facing area, the rectangular hole having edges extending along the main scanning direction and edges extending along the sub-scanning direction, the rectangular hole forming a shadow by light from the light source,
   wherein at least one of the edges extending along the sub-scanning direction located at a position corresponding to a central area of the photoelectric conversion element row with excluding each end thereof,
   wherein the sensor assembly including a light guide elongated in the main scanning direction, the light guide being configured to guide light from the light source in the main scanning direction;
   wherein the light source is located at one side of the light guide in the main scanning direction; and
   wherein the rectangular hole is formed at a position corresponding to the photoelectric conversion element row of the first sensor chip closest to the light source.

2. The scanning device according to claim 1, wherein the rectangular hole in the casing, configured to contact the original document table.

3. The scanning device according to claim 1, further comprising a controller,
   wherein the controller is configured to cause the sensor assembly to scan the rectangular hole for detecting a position of at least one edge of the rectangular hole, and determine a scanning start position by the sensor assembly in accordance with the detected position.

4. The scanning device according to claim 3,
   wherein the controller is configured to:
      detect a first position, in the sub-scanning direction, of at least one edge extending along the main scanning direction and a second position, in the main scanning direction, of at least one edge extending along the sub-scanning direction;
      determine the scanning start position in the main scanning direction in accordance with the detected first position; and
      determine the scanning start position in the sub-scanning direction in accordance with the detected second position.

5. The scanning device according to claim 3,
   wherein the controller is configured to detect a position, in the sub-scanning direction, of an edge connected from the facing area to the rectangular hole along a direction of light from the light source, from among edges of the rectangular hole in the main scanning direction.

6. The scanning device according to claim 1,
   wherein the rectangular hole is formed at a position above the original document placement surface, on which the original document is to be placed.

7. The scanning device according to claim 1, further comprising:
   an original document passage surface provided at a position that the sensor assembly is able to face from the opposite side of the original document placement surface, the original document passage surface being provided at one side in the sub-scanning direction with respect to the original document placement surface; and auto document feeder configured to the original document on the original document passage surface and convey the original document in the sub-scanning direction on the original document passage surface, wherein the rectangular hole is formed at a position between the original document placement surface and the original document passage surface.

8. The scanning device according to claim 1, wherein a distance between two edges, of the rectangular hole, extending along the sub-scanning direction is shorter than a length of the photoelectric conversion element row.

9. The scanning device according to claim 1, wherein two edges, of the rectangular hole, extending along the sub-scanning direction are arranged at a position corresponding to the central area of the photoelectric conversion element row.

10. The scanning device according to claim 1, wherein the central area is an area of the photoelectric conversion element row with excluding an area of 1 mm from each end thereof in the main scanning direction.

11. A scanning device, comprising:

a casing;

an original document table having a peripheral part being held by the casing, the original document table including an original document placement surface on which an original document is to be placed;

a sensor assembly movable in a sub-scanning direction to scan the original document placed on the original document table, the sensor assembly including a light source and a photoelectric converter which faces the original document table from an opposite side of the original document placement surface, the photoelectric converter including a plurality of sensor chips, each of the plurality of sensor chips including a photoelectric conversion element row in which a plurality of photoelectric conversion elements are arranged in a main scanning direction, a seam being provided between a position corresponding to a photoelectric conversion element row of a first sensor chip and a position corresponding to another photoelectric conversion element row of a second sensor chip, the first sensor chip being closest to the light source, and the second sensor chip being adjacent to the first sensor chip in the main scanning direction where the casing has a facing area facing the peripheral part of the original document table from a side of the original document placement surface, wherein a hole is formed on the facing area, the hole having edges substantially extending along the main scanning direction and edges substantially extending along the sub-scanning direction, the hole forming a shadow by light from the light source, wherein the edges substantially extending along the sub-scanning direction located at a position corresponding to a central area of the photoelectric conversion element row with excluding each end thereof, wherein the sensor assembly including a light guide elongated in the main scanning direction, the light guide being configured to guide light from the light source in the main scanning direction;

wherein the light source is located at one side of the light guide in the main scanning direction; and wherein the hole is formed at a position corresponding to the photoelectric conversion element row of the first sensor chip closest to the light source.

* * * * *